United States Patent [19]

Pranch et al.

[11] Patent Number: 4,756,465
[45] Date of Patent: Jul. 12, 1988

[54] METHOD OF COLD WELDING

[75] Inventors: Anatoly S. Pranch, Riga; Pavel I. Gursky, Kiev; Vasily I. Averkin; Petr S. Neminuschy, both of Donetsk; Vladimir N. Smirnov, Moscow; Evgeny A. Baranov, Moscow; Dmitry V. Leontiev, Moscow; Jury I. Goroshkov, Moscow; Vladimir N. Lozinsky, Moscow, all of U.S.S.R.

[73] Assignee: Latviisky Gosudarstvenny Institut, Riga, U.S.S.R.

[21] Appl. No.: 904,839

[22] Filed: Sep. 9, 1986

Related U.S. Application Data

[63] Continuation of Ser. No. 723,467, Apr. 15, 1985, abandoned.

[51] Int. Cl.$^4$ ............... B23K 20/00; B23K 20/12
[52] U.S. Cl. .................... 228/115; 228/116; 228/265; 228/112; 156/73.5
[58] Field of Search ............ 228/115, 116; 156/73.5; 228/265, 112

[56] References Cited

U.S. PATENT DOCUMENTS

| | | | |
|---|---|---|---|
| 2,942,748 | 6/1960 | Anderson | 228/112 |
| 2,992,019 | 7/1961 | MacArthur | 285/334.4 |
| 3,252,204 | 5/1966 | McFadden | 228/116 |
| 3,647,553 | 3/1972 | Coffey | 228/112 |
| 3,664,012 | 5/1972 | Wilke et al. | 228/115 |
| 3,694,010 | 9/1972 | Callahan, Jr. | 285/334.4 |
| 3,949,466 | 4/1976 | O'Brien et al. | 228/115 |
| 4,098,499 | 7/1978 | Noesen | 228/115 |
| 4,112,251 | 9/1978 | Scott | 174/87 |

FOREIGN PATENT DOCUMENTS

| | | | |
|---|---|---|---|
| 4914955 | 4/1974 | Japan | |
| 61987 | 4/1983 | Japan | 228/115 |
| 346056 | 8/1972 | U.S.S.R. | 228/115 |

OTHER PUBLICATIONS

Metals Handbook, Ninth Edition, Vol. 6, pp. 672–691, 1983.
P. Andreasen, N. Bay, and T. Wanheim, "Properties of Bonds in Slide Pressure Welding Stud to Plate", Proceedings of the 4th International Conference on Production Engineering, Tokyo, 1980, pp. 793–797.
Chuah Beng Ee, University of Auckland, School of Engineering, Department of Mechanical Engineering, Report No. 298, "Slide Pressure Welding," pp. 123–127, Mar. 1982.
A. Nielsen and N. Bay, "Friction Welding Copper to Aluminum: Interface Time–Temperature Influence on Metallurgical Structure and Weld Strength", Apr. 15–18, 1984, Helsingor, Denmark, pp. 187–193.
Anatol Prancs, "Mechanisms of Interaction Between Metallic Surfaces in Dry Friction," Proceedings of the J S L E International Tribology Conference, Jul. 8–10, 1985, Tokyo, Japan, pp. 1059–1064.

Primary Examiner—Nicholas P. Godici
Assistant Examiner—Samuel M. Heinrich
Attorney, Agent, or Firm—Fleit, Jacobson, Cohn & Price

[57] ABSTRACT

A method of cold welding of workpieces formed as axially symmetric bodies of rotation, wherein the workpieces are pressed into each other by applying an axial stress to at least one of the workpieces, and the workpieces are imparted a relative turn in a plane perpendicular to the direction of the axial stress.

13 Claims, 2 Drawing Sheets

METHOD OF COLD WELDING

This application is a continuation of application Ser. No. 723,467, filed Apr. 15, 1985, now abandoned.

FIELD OF THE INVENTION

This invention relates to cold welding and, more particularly, to methods of cold welding of components formed as axially symmetric bodies of rotation.

The invention is particularly usable in the welding of preferably tubular and rod-type members in electrical engineering applications, e.g. in welding tubular adapters utilized to join aluminum and copper conductor wires.

The invention is also usable in welding tubes and other members of systems adapted to carry liquids and gases.

BACKGROUND OF THE INVENTION

There is known a method of cold welding components formed as cylindrical bodies of rotation, particularly tubes, consisting in pressing the components one into another by applying an axial stress to at least one of such components.

The process is carried into effect as follows.

The end faces of the tubes to be joined are first cleaned, followed by preparation for overlap joining of the same, i.e. one of the tube ends is expanded such that the inner diameter of the tube is made slightly smaller than the outer diameter of the second tube. An axial stress is applied to press the end of one of the tubes into the other tube, followed by peeling any oxide film off the tube ends. The components are then welded together by applying a radial stress as the tube ends are swaged on a mandrel.

The known process is largely unsuitable for use in welding tubes of a material less plastic than aluminum, which requires a much higher stress to secure a welded joint, the resulting joints being largely destroyed by residual strain as the joint-forming stresses are released. The material is subject to heavy cracking at the time of its plastic working. The method is not adapted for joining tubing of a soft and hard metal, the radial compression of the ends of such tubes in the absence of complimentary operations leaving the harder metal either little strained or not at all so that a strong joint is not formed. The carrying of the method into effect further involves the use of specialized welding equipment.

SUMMARY OF THE INVENTION

It is an object of this invention to provide a method of cold welding components formed as axially symmetric bodies of rotation, comprising an operating step which will enable components of different materials to be welded together preferably without the use of specialized welding equipment.

This object is attained by providing a method of cold welding components formed as axially symmetric bodies of rotation, wherein components are pressed into one another by applying an axial stress to at least one of them and wherein, according to the invention, the components to be welded are imparted a relative turn in a plane normal to the direction of the axial stress.

By relatively turning the axially symmetric bodies of rotation to be pressed into one another weld areas are created where surface film is peeled off by the reciprocal action of the components, the total weld area being determined by the mechanical properties of the materials to be joined. At this time adhesion or cohesion occurs in the contact areas from which surface film has been removed, followed at the time of the relative turn of the faces by such areas growing to the extent that the mechanical properties of the materials to be joined make possible any changes in the shape of such contact areas. Thus plastically hardenable metals of the same hardness (aluminum/aluminum, copper/copper) tend to form joints which are indestructible by the relative displacement of the compressed surfaces: such joints may merge, the total weld area reaching levels comparable with the nominal contact area of the surfaces to be joined. Where metals of dissimilar hardness (aluminum/copper) are plastically hardened there is a more limited growth in contact (weld) areas than in the earlier case.

Components to be joined may have their faces tapered at different taper angles, the angle between such faces being best selected in the range of from 0° to 90° to increase that component of the force which is normal to the faces to be welded, and which by plastically straining the micrometric roughnesses in contact with one another and the components to be joined as a whole helps destroy surface film and enlarge the weld areas.

For best effect the angle between the faces to be welded together should be selected in the range of from 0° to 5°, the shape of the components to be joined experiencing in this case but little distortion.

In order to ensure the maximum total weld area the components to be joined are relatively turned along a helix about an axis coinciding with the direction of the axial stress.

BRIEF DESCRIPTION OF THE DRAWINGS

These and other features of the invention will become more readily understood from the following detailed description of a specific embodiment thereof, with reference to the drawings wherein.

DETAILED DESCRIPTION OF THE PREFERRED EMBODIMENTS

Figure 1:
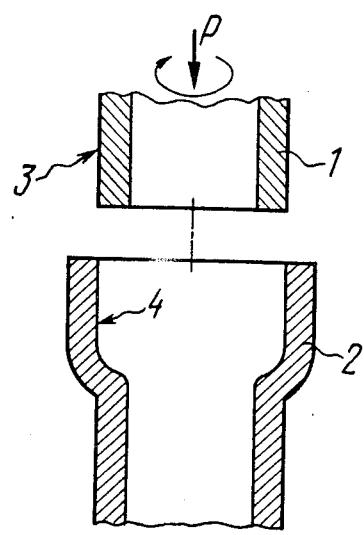
FIG. 1 is a longitudinal sectional view of tube ends prepared for cold welding according to the invention.

A method is proposed for cold welding components formed as axially symmetric bodies of rotation, particularly tubes 1 (FIG. 1) and 2, wherein the tubes 1 and 2 are pressed into one another by applying an axial stress P to at least one of the tubes (tube 1 in the drawing).

According to the invention the tubes 1 and 2 to be joined are imparted a relative turn (in the direction of the arrow) in a plane normal to the direction of the axial stress P.

The tube 1 is forced into the tube 2 at the time of the said turning action, the end of the tube 1 becoming progressively pressed into the end of the tube 2, contact faces 3 and 4 of the tubes 1 and 2, respectively, to be joined developing weld areas (bridges) where the surface film is peeled off, said areas growing in size as the tubes continue to be relatively turned.

Figure 2:
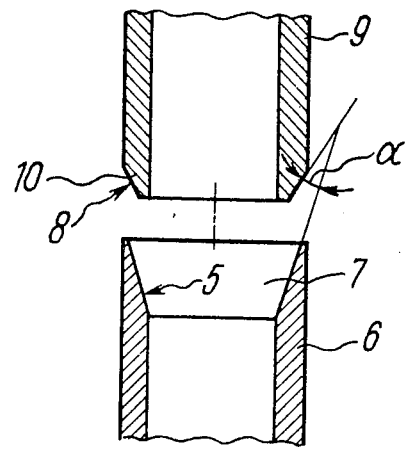
FIG. 2 is a longitudinal sectional view of tube ends with tapered contact faces according to the invention.

In order to enhance the force capable of straining the tubes to be joined and thereby subsequently to intensively destroy surface film with a view to securing a failfree cold weld joint, an inner face 5 (FIG. 2) on the end of tube 6 is shaped as a truncated cone 7, thereby giving the tube cross section the form of a taper. An outside area 8 of the end of a second tube 9 is also given the form of truncated cone 10 having a greater angle relative to the tube axis than that of the cone 7 of the tube 6, thereby shaping the cross section of the tube 9 as a taper that with a greater apex angle than the tube 6. The angle α between the faces 5 and 8 is selected in the range of from 0° to 90°.

In order to avoid heavy distortion to tubing in the weld areas, the angle α between the faces 5 and 8 of the tubes 6 and 9 to be joined is in specific cases selected from the range of from 0° to 5°.

During the joining operation one tube 9 is forced into the other tube 6. The tube 9 is progressively pressed into the tapered portion of the other tube 6. The destruction of surface film and the concurrent formation of a cold welded joint (cold welding by shift) are caused both by the displacement of the contact faces relative to one another and by the strain imposed on the tapered portion of the outer tube 6, wherein growth of the weld area is observed even where the tube 6 is of a harder metal than that of the inner tube 9.

Figure 3:
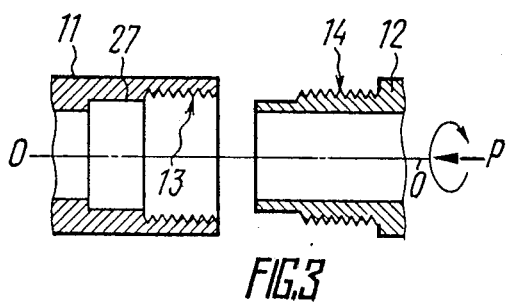
FIG. 3 is a longitudinal sectional view of tube ends of another design with screw threaded contact faces.

In FIG. 3 illustrating a particular design of a tube prepared for welding, tubes 11 and 12 to be joined are relatively turned (in the direction of the arrow) along a helix about an axis 0—0 which coincides with the direction of the axial stress P. In this case a female screw thread 13 is formed on a part of the inner cylindrical surface of the tube 11. The end of the second tube 12 to be joined is given a male screw thread 14 corresponding to the female thread 13 of the tube 11.

The above-described process is also suitable for joining long-length tubing with the aid of an adapter (not shown) to be made up onto both tubes, using a right-hand screw thread on one side and a left-hand thread on the other.

Figure 4:
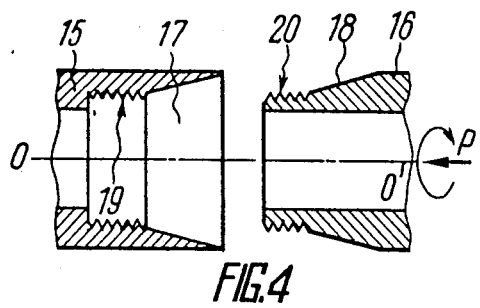
FIG. 4 shows tube ends of still another design.
Figure 5:
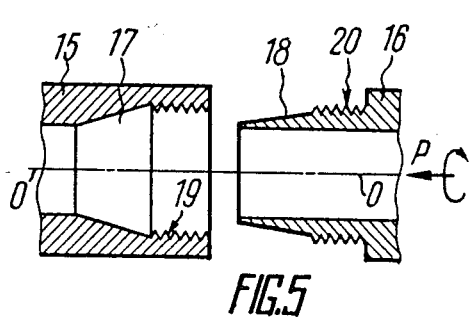
FIG. 5 shows tube ends of yet another design.

In a variant of tube preparation for welding which is equivalent to the one described above, use can be made of alternating cones 17 and 18 in the tubes 15 and 16, and threads 19 and 20, the cones and thread alternating in a different sequence (FIGS. 4, 5).

Figure 6:
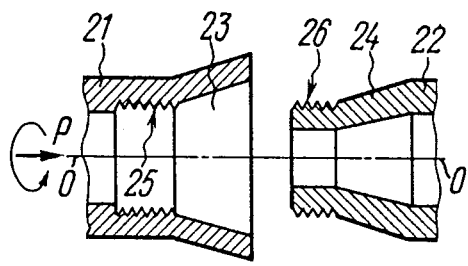
FIG. 6 illustrates tube ends of a further design.
Figure 7:
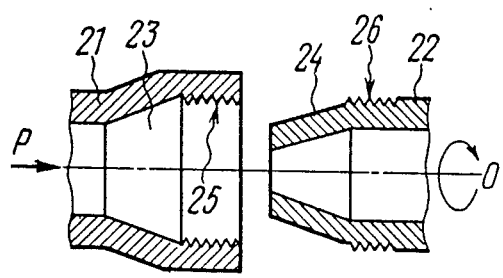
FIG. 7 shows tube ends of a still further design.

In another embodiment of the method the wall sections of tubes 21 and 22 may remain unchanged, but the tubes 21 and 22 are given tapers 23 and 24 and threads 25 and 26 are provided as in the first above-described embodiment (FIG. 6) or as in the second above-described embodiment (FIG. 7).

Still another embodiment of the method is where the tube 11 (FIG. 3) having a thread 13 is made to have a non-flat internal surface portion formed by shoulders 27 to resist the tube 12 being pressed in as it is made up to the tube 11 on the thread 14. The non-flat portion may be formed by a boundary between a threaded and a smooth tube portion, by a variably threaded portion, etc.

Combinations of the above-discussed embodiments may provide other embodiments of the method.

Below follow descriptions of specific embodiments of the method.

EXAMPLE 1

A copper and a aluminium tube having a 24 mm outer diameter and an 18 mm inner diameter and measuring about 70 mm long are provided. The inner diameter at one end of the copper tube is bored on a lathe to accommodate a 21×1.25 metric thread to about 25 mm in length, followed by cutting a female taper with an angle of about 12° at the cone apex over about 15 mm in length from the tube end. The aluminum tube has its outer diameter turned to accommodate a 21×1.25 metric thread, followed by cutting a male taper with an angle α of about 14° at the cone apex over about 10 mm in length from the tube end. After cutting the thread the contact faces of the tubes to be joined are carefully degreased (e.g. with acetone) and the tubes are made up with pipe wrenches until the tapered portions are fully overlapped.

EXAMPLE 2

Aluminium tubes having a 14 mm outer diameter and a 10 mm inner diameter and measuring about 90 mm long are provided. The inner diameter of one of the tubes is expanded on a lathe over a length 25 mm from the tube end to a 14 mm diameter so that the second tube can enter this thickened portion only if the non-flat portions on the contact faces are reciprocally plastically strained. The faces in contact during the joining operation are carefully degreased or machined (turned, ground), followed by pressing the end of the non-expanded tube into the expanded tube, e.g. by hammering; the tubes are then relatively turned through 30° using either pipe wrenches or a pipe wrench and a lathe or some other device.

EXAMPLE 3

Copper tubes having a 15 mm outer diameter and a 10 mm inner diameter and measuring about 90 mm long are provided. A tapered outer surface having an angle of about 7° at the cone apex is machined over on a lathe a length of 15 mm at the end of one of the tubes. A tapered inner surface having at the cone apex an angle about 0.5° to 1.0° smaller than that of the outer tapered surface of the second tube is similarly machined on a comparable portion of the second tube. After careful degreasing (e.g. with acetone) the tapered surfaces are pressed into one another (e.g. by hammering), followed by turning the tubes relative to one another through 45° (e.g. on a lathe).

EXAMPLE 4

A copper and an aluminium tube having a 24 mm outer diameter and an 18 mm inner diameter and measuring about 70 mm long are provided. The inner diameter at one end of the copper tube is bored on a lathe to accommodate a 21×1.25 metric thread to about 10 mm in depth, followed by machining an added inner tapered face with an angle of about 12° at the cone apex over depth of about 15 mm. The aluminium tube has its outer diameter turned over a length of about 25 mm from the tube end to accommodate a 21×1.25 metric thread, followed by machining over a length of about 15 mm from the tube end an outer tapered face with an angle of about 14° at the cone apex. The contact faces of the tubes to be joined are degreased and the tubes are made up with pipe wrenches until the machined tapered portions are fully overlapped.

EXAMPLE 5

A copper and an aluminum tube having a 24 mm outer diameter and an 18 mm inner diameter and measuring about 100 mm long are provided.

The end of the copper tube is expanded on a lathe to taper it over a length of about 15 mm into a conical shape with an apex angle of about 12°, followed by cutting a 20×1.25 female thread over about 10 mm of the non-expanded portion. The end of the aluminium tube is expanded over a length of about 10 mm to accommodate a 20×1.25 thread, the next portion of about 15 mm long is expanded into a tapered shape with an angle of about 14° at the cone apex. After the thread cutting and chemical treatment or machining (turning) of the tapered contact faces, the tubes are made up with pipe wrenches until the strain worked tube portions are fully overlapped.

EXAMPLE 6

A copper and an aluminium tube having a 24 mm outer diameter and an 18 mm inner diameter and measuring about 100 mm long are provided.

The end of the copper tube is expanded over a length of about 10 mm to accommodate a 20×1.25 thread, the next portion of about 15 mm long being expanded into a tapered shape with an angle of about 12° at the cone apex. The end of the aluminum tube is turned over a length of about 25 mm to accommodate a 20×1.25 thread, followed by expanding a portion of about 15 mm in length at the tube end into a tapered shape with an angle of about 14° at the cone apex. After the thread cutting and chemical treatment or machining of the contact faces to be joined the tubes are made up until the prepared ends are fully overlapped.

EXAMPLE 7

Steel tubes having a 33 mm outer diameter and a 26 mm inner diameter and measuring about 150 mm long are provided. The inner diameter at one end of one of the tubes is turned on a lathe to accommodate a 30×1.5 thread over a length of about 15 mm, the next portion of about 10 mm long having its inner diameter turned down to 29 mm. The outer diameter at one end of the second tube is turned down to 29 mm over a length of 10 mm so that it can enter the portion of the same diameter of the second tube only if the nonflat portions on the contact faces are reciprocally plastically strained. The outer diameter of the second tube is then turned down over a length of about 15 mm to accommodate a 30×1.5 thread. After thread cutting and chemical treatment or machining of the tube portions of 29 mm in diameter the tubes are made up with pipe wrenches until the machined portions are fully overlapped.

Unlike the existing methods of cold welding components, particularly tubing, the proposed method is practicable with a wide range of materials, the resulting joints suffering no destruction due to residual stresses.

Because tubing can be prepared for welding and the actual welding accomplished according to the invention using a single device, e.g. a conventional lathe, the required operations are reduced in number.

The proposed method is safe to carry into effect, there being no requirement for hydraulic or pneumatic devices.

The proposed method ensures consistent weld joint characteristics, their specific values depending on the properties and dimensions of tube preforms. For example, tubular adapters (aluminum/copper) for live conductors in a contact system, which are manufactured from tubes 24 mm in outer diameter and 3 mm thick, display a 3-4 $\mu$Ohm electric resistance in the welded zone and withstand tensile stresses up to 20 kN without failure.

What is claimed is:

1. A method of cold welding of workpieces formed as axially symmetric bodies of rotation, said method comprising:
    pressing two workpieces having end faces tapering at different angles, the difference between the taper angles being slightly greater than zero degrees, said two workpieces being pressed into overlapping engagement with each other by applying an axial stress to at least one of said workpieces and relatively rotating the workpieces to be welded through a rotation of less than one revolution about an axis of rotation extending in the direction of the axial stress to produce shear-loaded cold welded bridges between the workpieces which avoid destruction due to residual stresses.

2. A method as claimed in claim 1, wherein the angle between said faces of the workpieces to be welded is less than 90°.

3. A method as claimed in claim 2, wherein the angle between said faces of the workpieces to be welded is less than 5°.

4. A method as claimed in claim 3, wherein the relative rotation of the workpieces is effected along a helix about an axis which coincides with the direction of the axial stress.

5. A method as claimed in claim 1, wherein said axial stress is applied progressively.

6. A method as claimed in claim 1, wherein said relative rotation is less than about 45° of arc.

7. A method as claimed in claim 4, wherein the helix is defined by cooperating screw threads formed in each of the workpieces.

8. A method as claimed in claim 3, wherein the workpieces are metallic materials.

9. A method as claimed in claim 8, wherein the workpieces are each different metallic materials.

10. A method of cold welding of metallic workpieces formed as axially symmetric bodies of rotation, said method comprising:
    (a) placing a pair of metallic workpieces in surface contact, said workpieces having end faces tapering at different angles, the difference between the taper angles being slightly greater than zero degrees;
    (b) aligning the axes of said workpieces to be coaxial;
    (c) applying an axial stress to at least one of said workpieces to cause said workpieces to contact each other at said respective tapering faces; and
    (d) relatively rotating the workpieces less than one revolution about an axis of rotation extending in the direction of the axial stress while maintaining said axial stress to destroy a surface film of at least one of said workpieces at an area of contact with the other of said workpieces with the concurrent formation of a shear-loaded cold welded lap joint between the workpieces at the area of contact therebetween which avoids destruction due to residual stresses.

11. A method as claimed in claim 10, wherein each of said workpieces is formed from a different metal.

12. A method as claimed in claim 10 including the further step of forming conical cooperating surfaces at respective ends of said workpieces to be welded together, said conical surfaces each having different angles of inclination relative to a common axis, the difference between the angles of inclination being greater than 0° and less than about 5°.

13. A method as claimed in claim 12 including the further step of forming conical cooperating surfaces at respective ends of said workpieces to be welded together, said conical surfaces each having different angles of inclination relative to a common axis, the difference between the angles of inclination being greater than 0° and less than about 5°.

* * * * *